United States Patent [19]

Dougherty et al.

[11] Patent Number: 4,930,015

[45] **Date of Patent: * May 29, 1990**

[54] FLAT TENSION MASK CATHODE RAY TUBE IMPLOSION SYSTEM

[75] Inventors: Lawrence W. Dougherty, Sleepy Hollow; Sae D. Lee, Buffalo Grove; Melvin F. Rogers, Western Springs, all of Ill.

[73] Assignee: Zenith Electronics Corporation, Glenview, Ill.

[*] Notice: The portion of the term of this patent subsequent to Apr. 19, 2005 has been disclaimed.

[21] Appl. No.: 178,111

[22] Filed: Apr. 6, 1988

Related U.S. Application Data

[63] Continuation-in-part of Ser. No. 941,458, Dec. 15, 1986, and Ser. No. 894,984, Aug. 8, 1986.

[51] Int. Cl.[5] .......... H04N 5/65

[52] U.S. Cl. .......... 358/246; 358/245; 358/247; 313/477 R

[58] Field of Search .......... 358/245, 246, 247, 248; 313/477, 482; 220/1 R, 1 A; 156/289

[56] References Cited

U.S. PATENT DOCUMENTS

| | | | |
|---|---|---|---|
| 2,147,017 | 2/1939 | Doetzel, Jr. . | |
| 2,596,863 | 5/1952 | Moulton et al. . | |
| 2,734,142 | 2/1956 | Barnes . | |
| 2,785,820 | 3/1957 | Vincent et al. . | |
| 3,007,833 | 11/1961 | Jackman . | |
| 3,051,782 | 8/1962 | Giacchetti et al. . | |
| 3,075,870 | 1/1963 | Hedler et al. . | |
| 3,113,347 | 12/1963 | Kufrovich . | |
| 3,130,854 | 4/1964 | Casciari . | |
| 3,177,090 | 4/1965 | Bayes . | |
| 3,184,327 | 5/1965 | Anderson . | |
| 3,200,188 | 8/1965 | Lange et al. . | |
| 3,208,902 | 9/1965 | Arond et al. . | |
| 3,265,234 | 8/1966 | McGary, Jr. et al. . | |
| 3,315,035 | 4/1967 | Applegath et al. . | |
| 3,321,099 | 5/1967 | Carlyle et al. . | |
| 3,422,298 | 1/1969 | De Gier . | |
| 3,708,622 | 1/1973 | Brown . | |
| 3,879,627 | 4/1975 | Robinder . | |
| 4,031,553 | 6/1977 | Sumiyoshi et al. . | |
| 4,158,419 | 6/1979 | Nolan | 358/245 |
| 4,277,299 | 7/1981 | Cherenko et al. | 156/289 |
| 4,329,620 | 5/1982 | Lanciano . | |
| 4,415,932 | 11/1983 | Rogers | 358/248 |
| 4,544,955 | 10/1985 | Swank et al. | 358/245 |
| 4,556,821 | 12/1985 | Cooper | 358/245 |
| 4,599,274 | 7/1986 | Ando et al. . | |
| 4,704,565 | 11/1987 | Blacker, Jr. et al. | 313/412 |
| 4,739,412 | 4/1988 | Lee | 358/247 |

FOREIGN PATENT DOCUMENTS

| | | |
|---|---|---|
| 2346301 | 3/1977 | France . |
| 0151942 | 8/1985 | Japan . |
| 889457 | 2/1962 | United Kingdom . |
| 875612 | 8/1981 | United Kingdom . |

OTHER PUBLICATIONS

Patent Abstracts of Japan, vol. 8 No. 209 (E-268) [1646], 22 Sep. 1984; and JP-A-59 96 637 (Mitsubishi Denki K.), 4-6-84.

*Primary Examiner*—James J. Groody
*Assistant Examiner*—Kim Yen Vu

[57] ABSTRACT

A CRT implosion protection system having a resin system releasably bonding an implosion panel to the faceplate of a flat or concave CRT and a tension band system secured around the periphery of the faceplate which exerts compression thereon. The tension band system includes a pair of keeper bars which prevent the tension band from slipping, and which secure an external magnetic shield to the CRT.

18 Claims, 2 Drawing Sheets

FLAT TENSION MASK CATHODE RAY TUBE IMPLOSION SYSTEM

RELATED APPLICATIONS

This application is a continuation-in-part of U.S. applications Ser. No. 06/941,458, filed Dec. 15, 1986, entitled, "Cathode Ray Tube Contrast Enhancement System" and Ser. No. 894,984, filed Aug. 8, 1986, entitled "Cathode Ray Tube Implosion Protection System".

BACKGROUND OF THE INVENTION

The implosion which occurs upon breakage of the envelope of an evacuated cathode ray tube (CRT) is quite dangerous. Impact on the glass faceplate of such a tube can cause a faceplate to shatter into many fragments, which may be violently driven into the interior of the tube by external air pressure. The glass fragments then rebound outwardly and are ejected with sufficient force to cause serious injury to a person standing in front of the tube. Until recently, all color television tubes have consisted of CRT's with convexly curved face plates. Such faceplates resist external air pressure in much the same manner as an arch supports an architectural load, and for that reason prior art methods of implosion protection have proved adequate.

Three techniques of implosion protection were previously used with curved faceplates. In one of these, a metal band in hoop tension around the skirt of the faceplate exerts a radial compressive force which cooperates with the external air pressure to put the curve faceplate in the compression. This system is exemplified by the following U.S. Patents: Henry et al, U.S. Pat. No. 2,147,017; Vincent et al, U.S. Pat. No. 2,785,820; and Lange et al, U.S. Pat. No. 3,200,188.

These tension band systems depend upon the fact that the glass faceplate is under compression. Although brittle, glass is quite strong when it is under compression. The prior art has also been known to fasten metal strips along the side of the curved faceplate underneath the metal tension band. The metal strips redistribute the compression load applied by the tension band to the faceplate s that the load is not concentrated at the corners of the faceplate.

In a second prior art system, known as the resin bond approach, a shell is placed around the faceplate skirt and filled with epoxy. The epoxy glues the faceplate to the funnel (rear portion) of the tube to keep scattering of the glass fragments at a minimum.

Then there is a third approach, which involves securing an implosion protection panel to the front surface of the faceplate by means of an adhesive which tightly bonds the two members together to form a monolithic structure. There is a significant body of prior art disclosing the use of bonded panels in connection with curved faceplates, including the following patents:

| U.S. Patents | |
|---|---|
| Sumiyoshi et al. | 4,031,553 |
| Moulton et al. | 2,596,863 |
| Jackman | 3,007,833 |
| Giacchetti et al. | 3,051,782 |
| Hedler et al. | 3,075,870 |
| Kufrovich | 3,113,347 |
| Casciari | 3,130,854 |
| Anderson | 3,184,327 |
| McGary et al. | 3,265,234 |

-continued

| | |
|---|---|
| Applegath et al. | 3,315,035 |
| De Gier | 3,422,298 |
| Carlyle et al. | 3,321,099 |
| Lanciano | 4,329,620 |
| Arond et al. | 3,208,902 |
| Bayes et al. | 3,177,090 |
| Barnes | 2,734,142 |
| British Patents | |
| Downing | 875,612 |
| Darlaston et al. | 889,457 |

But curved faceplates require that the shadow mask employed in color TV systems must also be curved. Recently, a superior color CRT has been invented which employs a flat, tensioned shadow mask and a flat faceplate, and this has resulted in a major improvement in the brightness and/or contrast of the color image.

Unfortunately, the implosion protection systems which have been used successfully with curved faceplate tubes have proven inadequate when used with flat faceplates. In particular, when prior art implosion protection systems are tested on the new flat tension mask tubes, they fail to meet UL1418, the relevant safety standard of Underwriters Laboratories, Inc. for television implosion hazards.

Attempts to use prior art implosion protection approaches with flat tension mask tubes have been unsuccessful. In particular, systems employing implosion protection panels bonded to the front of the faceplate have not proved satisfactory. High speed video tape motion pictures of test implosions of flat tension mask tubes show clearly that the entire monolithic implosion panel-and-faceplate structure disintegrates as a unit upon frontal impact, creating an abundant supply of glass fragments which are fired out the front of the tube at high velocity. The effect is a dangerous blizzard of glass shards.

The prior art also discloses the use of an external magnetic shield placed around the funnel portion of a CRT. The external magnetic shield is utilized to protect the CRT from the earth's magnetic field and thus enhance the quality of the picture. A color CRT is usually manufactured and shipped without such an external magnetic shield. Prior art methods of subsequently securing such a shield to the CRT generally involve the use of add-on fastening means near either end of the shield.

A new type of implosion protection system has recently been developed and is disclosed in the patent applications cited above. This system employs a UV-curable releasable resin formulation to bond an implosion panel to a CRT faceplate, the formulation being designed to achieve separation of the implosion panel from the faceplate upon impact.

The present invention provides a modification of the above-described implosion protection system, adding a tension band which cooperates with the previously disclosed implosion panel and resin layer system to help prevent dangerous implosions. The tension band system can also be used to secure an external magnetic shield to the CRT. It has been discovered that the alternative approach, like its predecessors, also provides an extremely reliable flat faceplate implosion protection system.

More specifically, this alternative approach contemplates the addition of a tension band assembly to a faceplate having a resin system which releasably binds an implosion panel to the faceplate. The tension band assembly includes a metal tension band and optionally also comprises metal keeper bars or strips around the CRT faceplate. The latter make it possible to secure an external magnetic shield around the CRT funnel at the time of production, and also to secure the metal tension band to the faceplate. The metal strips also redistribute the compression load applied by the tension band to the faceplate, so that the load is not concentrated at the corners of the faceplate. The result is an implosion protection system for flat-faced CRT's that is extremely reliable.

Preferred embodiments demonstrating the various objectives and feature of the invention will now be described in conjunction with the following drawings, which constitute a part of this specification:

DETAILED DESCRIPTION OF THE PREFERRED EMBODIMENTS OF THE INVENTION

Figures 1, 2, 3:
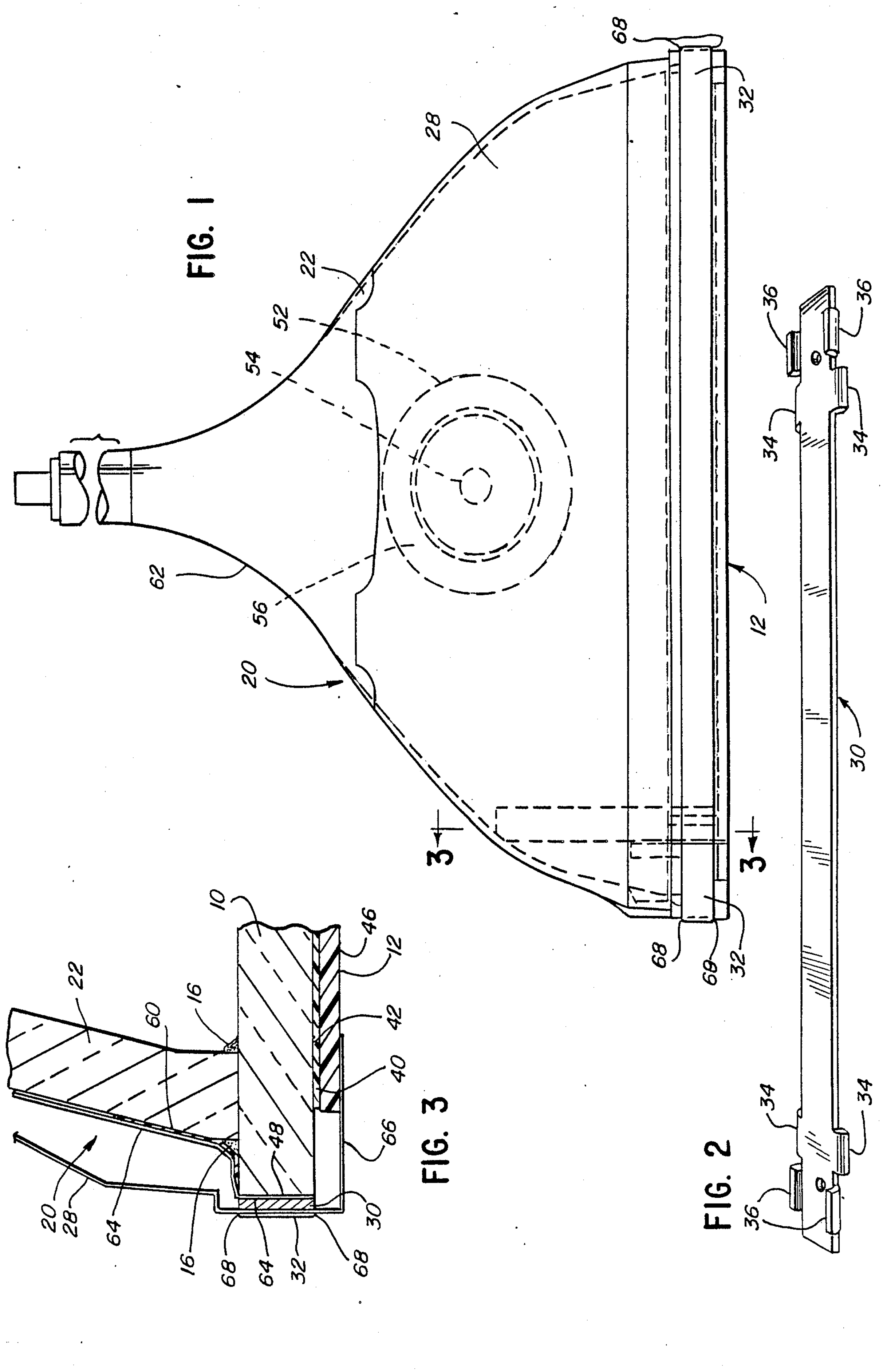
FIG. 1 is a top plan view of a flat tension mask cathode ray tube having an implosion protection system with a tension band, metal keeper strips, an adhesive resin bonding system, and an external magnetic shield secured to the tube.
FIG. 2 is a perspective view of the metal strip which is placed between the tension band and the side of the faceplate of the cathode ray tube of FIG. 1.
FIG. 3 is a partial longitudinal cross-sectional view of the same cathode ray tube illustrating the adhesive bonding system and the tension band system.

Referring to FIGS. 1 and 3, an evacuated CRT tube 20 comprises a funnel 22 and flat faceplate 10. Funnel 22 is sealed to faceplate 10 by means of glass frit 16 as illustrated in FIG. 3. A glass implosion panel 12 is bonded to the external surface of faceplate 10 by means of a resin system 14. Implosion panel 12 is substantially thinner and more flexible than the faceplate 10. The implosion panel is commercial double-strength window glass with a thickness of an eighth of an inch, and has a conventional antiglare coating 46 on its outer face. Two metal keeper bars 30 are positioned respectively above and below the faceplate 10. A tension band 32 encircles the periphery of the faceplate 10 and is assembled with the keeper bars in a manner to be described below. Double-stick fiberglass tape 48 is secured around the perimeter of faceplate 10 to prevent contact of the metal keeper bars 30 and metal tension band 32 with the faceplate 10. A layer 62 of conductive dag is applied to the exterior of the funnel to drain charge, as is conventional in the CRT art.

Illustrated in FIG. 1 is an external magnetic shield 28 which is held in place near its front end, above and below the faceplate, by clamping between the metal keeper bars 30 and the tension band 32 as seen in FIG. 3. The shield 28 protects the CRT from the earth's magnetic field, thereby enhancing the image. In this invention it is affixed to the CRT in production as an integral part of the assembly, not an optional extra to be added later.

The shield 28 is constructed of sheet metal, and has an aperture 52 to allow access to an anode button 54. A grommet 56, which may consist of silicone rubber, is inserted in the aperture 52 and provides electrical insulation between the anode button 54 and the external magnetic shield 28. Additionally, shield 28 has apertures 68 which secure the shield to clasps 34 of metal keeper bars 30.

The metal keeper bars 30 are used to keep the tension band 32 from slipping rearwardly and forwardly on faceplate 10, and also to distribute the compressive load of tension band 32 away from the corners of faceplate 10. One of the two keeper bars 30 is preferably placed on each of the longer sides of faceplate 10. These bars 30 secure the tension band 32 to the periphery of faceplate 10 with two sets of clasps 34, 36. Clasps 34 grasp the side of faceplate 10, and clasps 36 grasp the tension band 32 through apertures 68 of external magnetic shield 28.

Figure 4:
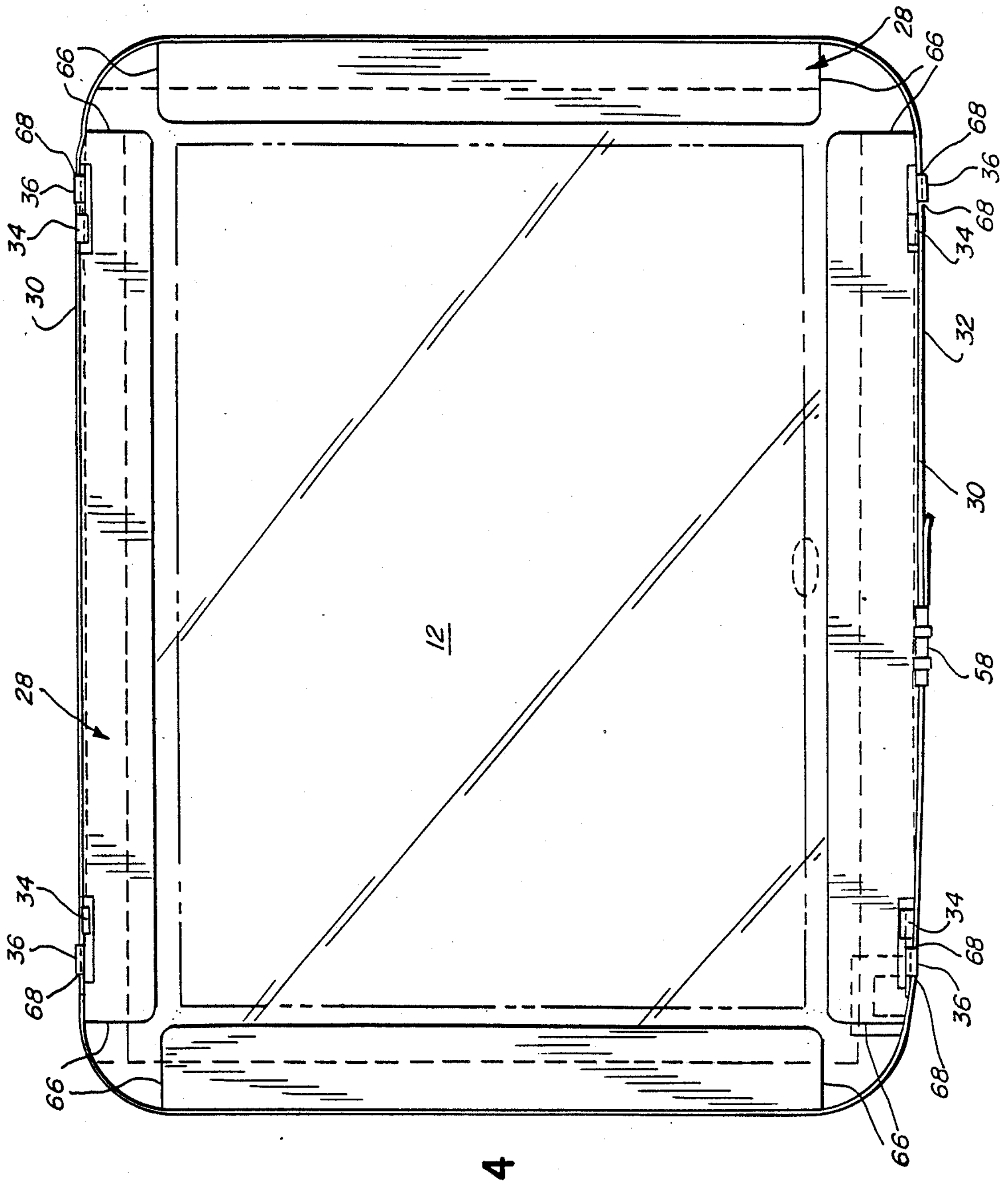
FIG. 4 is a front elevational view of the same cathode ray tube.

Tension band 32 is wrapped around the perimeter of faceplate 10, and holds the faceplate 10 in compression. Tension band 32 is a thin metal band about twenty to thirty thousandths of an inch thick. As seen in FIG. 4, a conventional buckle 58 secure the two ends of tension band 32 together.

Referring to FIG. 3, the preferred embodiment of the implosion protection system has a resin layer 40 which binds the faceplate 10 to implosion panel 12. A release layer 42 is disposed between the resin layer 40 and faceplate 10 in order to achieve differential adhesion. That is, the release layer causes the resin system to adhere substantially more strongly to either the implosion panel or the faceplate than it does to the other, which has important advantages for implosion protection as described and explained in greater detail in the parent patent applications referenced above. In the preferred embodiment, the resin system adheres more strongly to the implosion panel than to the faceplate, because the release layer is on the faceplate side of the resin layer, but the reverse could be true.

The resin layer 40 must have a thermal stability sufficient to meet U.L. standards (which require that laminated picture tubes withstand 149 degrees Celsius for 50 hours, and 154 degrees Celsius for 40 hours). They must also exhibit ultra-violet stability and have an index of refraction that substantially matches the index of refraction of the glass faceplate and implosion panel.

The preferred composition of the resin 40 is:

(a) about 53.5% by weight of Uvithane 893; from Morton Thiokol, Inc.;
(b) about 27.0% by weight M-100 from Union Carbide Corp.;
(c) about 18.0% by weight of SR-681 from Sartomer Company;
(d) about 0.2% by weight of Tinuvin 292 from Ciba-Geigy Corp; and
(e) about 0.3% by weight of NB 50 from CPS Chemical Company.
(f) about 1.0% Irgacure 184.
(g) about 1.0% Irgacure 184.

The preferred release agent used with the above resin composition consists of 2% DC193 from Dow Corning Corp. dissolved in isopropanol.

Other combinations of resin and release layer combinations can be used. Another example of a release agent is as follows: 1% by weight of Agestat 42 from CPS Chemical Co.; 90% by weight methanol; 0.5% by weight DC193 from Dow Corning Corp.; 8.5% by weight of deionized water; and 5% by weight IPA.

Bonding of the implosion panel 12 to the faceplate 10 with the resin can be achieved in several ways. The preferred method begins with the application of the liquid release agent to the CRT faceplate 10. The agent is applied o the outer surface of the faceplate by simply rubbing the agent on with a towel or the like.

Next, the resin 40 is applied in liquid form to the outer surface of the faceplate 10 (over the release agent). A shim is then placed on each corner of the panel. The shims may range from 10 to 40 mils in thickness. The implosion panel 12 is then placed slowly on the shims. A uniform resin thickness is desired, and this is most easily achieved by placing one edge of the implosion panel 12 on two shims and then slowly lowering the remaining portion of the implosion panel 12 into place.

Next, the corners of the implosion panel are secured by tape and the shims are removed. The resin 40 is then cured by exposure to ultra-violet light using a Fusion Systems AEL unit with a D lamp at an exposure distance of about 14 inches for about 20 seconds from the implosion panel side. The tape may then be removed. After curing, resin 40 adheres strongly to the inner surface of the implosion panel 12, and less strongly to the outer surface of the faceplate.

The tension band system is assembled as follows: A double-stick fiberglass adhesive tape 48 is placed on the peripheral surface of the faceplate 10 around all four sides. Vinyl adhesive tape 60 is placed on funnel 22 from the dag 62 to near the rearward end of the side of faceplate 10. Copper electrically conductive tape 64 is then placed over the vinyl tape 60 and extending to the front of faceplate 10.

Next, a metal keeper bar 30 is snapped in place on each of the two long sides of the faceplate 10 by means of clasps 34. The two keeper bars 30 will cover and run parallel to the tape 48 on two sides of faceplate 10, and one of the keeper bars 30 will also be in contact with copper tape 64 (which runs generally perpendicular to that keeper bar).

The external magnetic shield 28 is then placed around the funnel 22 and the faceplate 1O. The front edge 66 of external magnetic shield 28 extends about an inch beyond the implosion panel 12. Clasps 36 of metal keeper bars 30 are inserted through apertures 68 of the external magnetic shield 28 to secure the shield to the faceplate 10.

The tension band 32 is then wrapped around the faceplate periphery, pulled to a tension of about 1000 PSI, clamped at buckle 58, and snapped into clasps 36. Tension band 32 is thus in contact with shield 28 around the periphery of faceplate 10, so that the shield 28 is thereby secured to metal keeper bars 30 along the two long sides of faceplate 10 and is in contact with adhesive tape 48 along the other two sides. Thereafter, the edge 66 of the external magnetic shield 28 is folded over the implosion panel 12 as seen in FIG. 3.

A significant advantage of the invention is, of course, its implosion reliability: i.e., the ability of the system to hold intact the broken glass of the faceplate 10 and the implosion panel 12 upon frontal impact to the panel 12. The improved protection system holds the cracked faceplate 10 together and allows the pressure in the CRT to go ambient by transferring the stress to the funnel 27, thereby causing the funnel to crack first and allowing ambient air into the CRT. In effect, the CRT vents itself.

Thus, it will now be appreciated that the present invention provides a highly reliable implosion protection system for use in connection with flat or concave faceplate CRT's. The implosion protection system utilizes a releasable resin system which secures the implosion panel to the faceplate, in combination with a tension band system which exerts compressive force on the faceplate and metal keeper bars which secure the tension band in place and which also help distribute the compressive load exerted by the tension band. Additionally, it will be appreciated that factory installation of an external magnetic shield on the CRT is facilitated by this mechanism.

Still other embodiments of the principles of this invention are contemplated, and the appended claims are intended to cover such other embodiments as are within the spirit and scope of this invention.

The claimed invention is:

1. A flat tension mask cathode ray tube comprising a brittle faceplate member, an implosion protection panel member, an adhesive system bonding said panel member to said faceplate member, and a tension band system around the periphery of said faceplate member which exerts compression on said faceplate member.

2. A flat tension mask cathode ray tube comprising a brittle faceplate member, an implosion protection panel member, an adhesive system bonding said panel member to said faceplate member which adheres substantially more strongly to one of said members than to the other, and a tension band system around the periphery of said faceplate member which exerts compression on said faceplate member, said adhesive system comprising at least one layer of adhesive material adhered to one of said members and a release layer between said adhesive layer and the other of said members.

3. A flat tension mask cathode ray tube comprising a brittle faceplate member, an implosion protection panel member, an adhesive system bonding said panel member to said faceplate member which adheres substantially more strongly to one of said members than to the other, and a tension band system around the periphery of said faceplate member which exerts compression on said faceplate member, said adhesive system comprising at least one layer of adhesive material adhered to said panel member and a release layer between said adhesive layer and said faceplate member.

4. A flat tension mask cathode ray tube comprising a brittle faceplate member an implosion protection panel member, an adhesive system bonding said panel member to said faceplate member which adheres substantially more strongly to one of said members than to the other, and a tension band system around the periphery of said faceplate member which exerts compression on said faceplate member, said tension band system comprising a band member encircling said faceplate periphery and means for keeping said band member in tension thereabout.

5. A flat tension mask cathode ray tube comprising a brittle faceplate member, an implosion protection panel member, an adhesive system bonding said panel member to said faceplate member, and a tension band system around the periphery of said faceplate member which exerts compression on said faceplate member, said tension band system comprising a band member and at least one keeper means placed on at least one side of said faceplate member and disposed between said tension band and said side of said faceplate member, said keeper means having fastening means to secure said keeper means to said faceplate member and to secure said keeper means to said tension band.

6. A cathode ray as in claim 5 wherein said fastening means comprise clasp means extending in opposite directions from said keeper means.

7. A flat tension mask cathode ray tube comprising a brittle faceplate member, an external magnetic shield, an implosion protection panel member, an adhesive system bonding said panel member to said faceplate member which adheres substantially more strongly to one of said members than to the other, a tension band system around the periphery of said faceplate member which exerts compression on said faceplate member and comprises means securing said external magnetic shield to said cathode ray tube, said tension band system including a tension band member keeper means disposed on opposing sides of said faceplate member between said faceplate member and said tension band member.

8. A cathode ray tube as in claim 7 wherein said external magnetic shield has means interposed between the keeper means and the tension band member.

9. An evacuated display device comprising a brittle faceplate member, an external magnetic shield, an implosion protection panel member, an adhesive system bonding said panel member to said faceplate member which adheres substantially more strongly to one of said members than to the other, a tension band system around the periphery of said faceplate member which exerts compression on said faceplate member and comprises means securing said external magnetic shield to said evacuated display device, said tension band system including a tension band member keeper means disposed on opposing sides of said faceplate member between said faceplate member and said tension band member, wherein said external magnetic shield comprises aperture means, and said means for securing said external magnetic shield comprises at least one pair of protrusions on said keeper means receivable by said aperture means.

10. A device as in claim 9 wherein said protrusions also engage and secure said tension band member to said device.

11. An evacuated display device comprising a brittle faceplate member, an implosion protection panel member, an adhesive system bonding said panel member to said faceplate member which adheres substantially more strongly to one of said members than to the other, a tension band system secured around the periphery of the faceplate member putting the faceplate member in compression, and an external magnetic shield secured on the evacuated display device by the tension band system, the adhesive system comprising a single layer of resin and a release agent between the faceplate member and the resin layer, said tension band system comprising keeper means secured on opposite sides of the faceplate member and a tension band member around the periphery of the faceplate member, said keeper means also being secured to the tension band member, the external magnetic shield having means interposed between the keeper means and the tension band member and interengaging with said keeper means, thereby locking the external magnetic shield to the device.

12. The cathode ray tube or device claimed by any of claims 1-6 and 7-11 wherein said adhesive system includes a UV-curable resin layer.

13. The invention of claim 12 wherein the resin layer consists essentially of the following composition by weight:

about 53.5% Uvithane 893
about 27.0% M-100
about 18.0% SR-681
about 1.0% Ingacure 184
about 0.2% Tinuvine 292 and
about 0.3% NB 50.

14. The invention of claim 13 wherein the adhesive system incorporates a release agent between said resin layer and said faceplate member or implosion protection panel member.

15. The invention of claim 14 wherein the release agent consists essentially of 2% DC193 by weight from Dow Corning, Corp dissolved in isopropanol.

16. A method of manufacturing a flat tension mask cathode ray tube having a faceplate member and an implosion panel member, comprising the steps of:

applying a resin-release agent to the outer face of the faceplate member;

applying an ultraviolet-curable adhesive resin to the faceplate member over the release agent and placing the implosion panel member on top of the resin;

ultraviolet-curing the resin to provide a releasable bond between the faceplate member and the implosion panel member;

applying a double-stick tape to the periphery of the faceplate member;

securing at least one keeper means to at least one peripheral side of the faceplate member;

wrapping a thin tension band around the keeper means and around the periphery of the faceplate member, and securing the tension band to the keeper means; and securing the tension band so that it is in tension around the faceplate member.

17. A method of manufacturing a cathode ray tube having a faceplate member, an implosion panel member, and an external magnetic shield, comprising the steps of:

securing the implosion panel member to the front surface of the faceplate member;

securing keeper means to the periphery of the faceplate member, the keeper means comprising means for attachment to the faceplate member and to the magnetic shield;

placing the external magnetic shield around the cathode ray tube and in engagement with the attachment means of the keeper means;

placing a tension band member around the keeper means and around the periphery of the faceplate member and engaging the tension band member with the attachment means of the keeper means;

and securing the tension band member so that it is in tension around the faceplate member.

18. A method as in claim 17 comprising the additional step of interposing a portion of said external magnetic shield between said keeper means and said tension band member.

* * * * *